Patented June 3, 1930

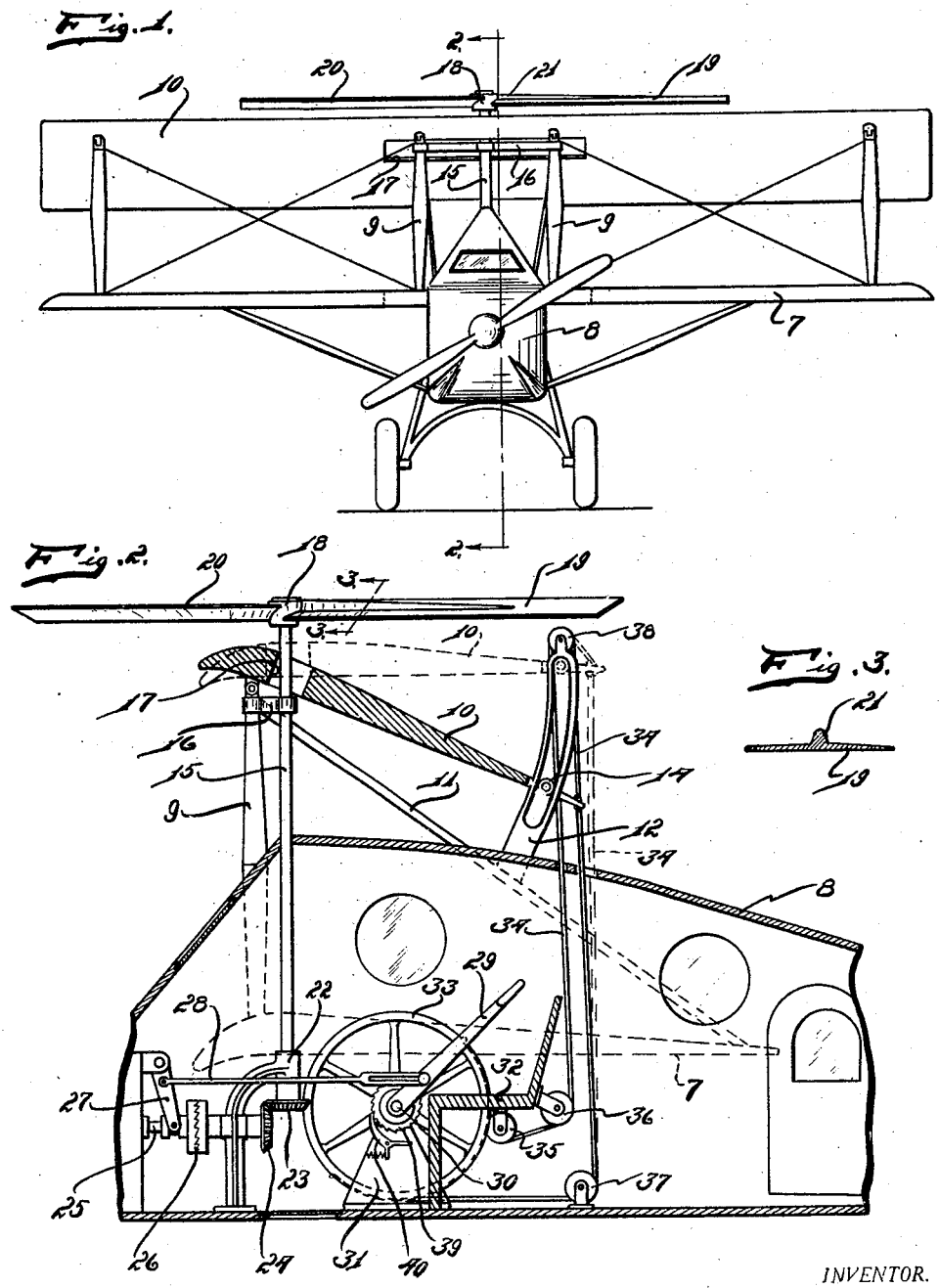

1,761,777

UNITED STATES PATENT OFFICE

JOSEPH CICCOIANNI, OF DETROIT, MICHIGAN

AEROPLANE

Application filed October 14, 1929. Serial No. 399,489.

My invention relates to a new and useful improvement in an aeroplane and an object of the invention is the provision of a horizontally disposed propeller arranged to provide a maximum length and width and so tilted to the horizontal as to afford the maximum efficiency in its operation.

Another object of the invention is the provision of a structure whereby the wing span may be decreased and the propeller length increased. Other objects will appear hereinafter.

The invention consists in a combination and arrangement of parts hereinafter described and claimed.

Another object of the invention is the provision of a wing structure in an aeroplane whereby a tiltable wing may be mounted and its width reduced to a minimum without materially increasing its resistance to tilting movement.

The invention will be best understood by a reference to the accompanying drawings which form a part of this specification and, in which, Fig. 1 is a front elevational view of the aeroplane embodying the invention.

Fig. 2 is a sectional view taken on line 2—2 of Fig. 1.

Fig. 3 is a sectional view taken on line 3—3 of Fig. 2.

The lower wing 7 is suitably secured to the body 8 and projecting upwardly from the forward side of the wing 7 are posts 9 to which is pivotally connected the upper wing 10 adjacent its forward edge. Extending from the upper end of the posts 9 inclined rearwardly and downwardly are braces 11 which are connected at their lower ends to the lower wing 7 adjacent its rearward edge.

Secured to and projecting upwardly from the brace 11, intermediate the ends thereof, are arcuate guide members 12 having the elongated slot formed therein in which engage rollers 14 mounted on the wing 10.

Projecting upwardly is the vertically extending shaft 15 projected through a bracket 16 mounted on post 9 and through a slot 17 formed in the wing 10. Fixedly mounted on the upper end of shaft 15 is the propeller hub 18 projecting outwardly from which are blades 19 and 20, each of these blades being tilted oppositely to the horizontal and provided adjacent the wing end on the upper surface with a reinforcing rib 21. The shaft 15 projects through the journal 22 and is provided with a bevel gear 23, meshing with the gear 24 mounted on a shaft which is driven by the shaft 25 through the clutch connection 26. The shaft 25 is suitably connected to the motor of the device. A yoke arm 27 serves to control the clutch 26 and is connected by the rod 28 to an operating lever 29. This operating lever 29 is fixedly mounted on a shaft 30 supported on suitable standards 31 which are positioned adjacent the seat 32 in which is accustomed to ride the operator of the vehicle. A reel 33 is fixedly mounted on the shaft 30 and passed around the reel is a flexible element 34 which passes around the guide pulleys 35, 36, 37, and the pulley 38 which is mounted on the upper end of the arcuate arm 12. The opposite ends of the flexible member 34 are attached to the rear end of the wing 10 so that by rotating the reel 33 in either direction the wing may be tilted upwardly or downwardly at will. A ratchet wheel 39 is mounted on the reel and rotatable therewith. A dog 40 engages the teeth of the ratchet wheel and serves to prevent reverse movement of the reel when wound. The arrangement is such that a rocking of the handle 29 will effect the upward or downward tilting of the wing 10. When tilting downwardly the wing 10 serves to assist in lifting the aeroplane upon the forward movement of the aeroplane.

By connecting the arcuate arm 12 in the manner indicated the width of the wing can be reduced to a minimum and the length of the propeller increased proportionately to the wing thus affording a maximum lifting effect by the propeller which is operated upon a rotation of the shaft 15. Through the connections of the clutch yoke 27 and the arm 29 a rotation of the propeller may be easily and quickly controlled.

By forming the propeller in the manner indicated in cross section and as described, increase in efficiency in the propeller over ordinary types is afforded.

While I have illustrated and described the preferred form of construction I do not wish to limit myself to the precise details of structure shown but desire to avail myself of such variations and modifications as come within the scope of the appended claims.

Having thus described my invention what I claim as new and desire to secure by Letters Patent is:

1. In an aeroplane, a pair of wings positioned one above the other, one of said wings being of less width than the other; vertically extending supporting members; means for connecting said supporting members at their upper end pivotally to the upper wing adjacent its forward edge; a brace connecting said supporting members adjacent their upper end to the lower wing adjacent its rear edge; arcuate guide members mounted upon and projecting upwardly from said brace intermediate the ends thereof and provided with an elongated slot and rollers mounted on said tiltable wing and engageable in said slot.

2. In an aeroplane, a pair of wings mounted one above the other, the upper wing being narrower than the lower wing; vertically extending supporting members projecting upwardly from said lower wing; means for tiltably mounting said upper wing adjacent its forward edge on upper end of said supporting members; a diagonally extending brace connecting each of said supporting members at its upper end to the rear end of said lower wing; an arcuate arm mounted on and projecting upwardly from said supporting members intermediate the ends thereof, said arcuate members having an elongated slot formed therein; a pulley mounted on upper end of each of said arms and means projected around said pulley for tilting said wing.

3. In an aeroplane, a pair of wings mounted one above the other, the upper wing being narrower than the lower wing; vertically extending supporting members projecting upwardly from said lower wing; means for tiltably mounting said upper wing adjacent its forward edge on upper end of said supporting members; a diagonally extending brace connecting each of said supporting members at its upper end to the rear end of said lower wing; an arcuate arm mounted on and projecting upwardly from said supporting members intermediate the ends thereof, said arcuate members having an elongated slot formed therein; a pulley mounted on upper end of each of said arms and means projected around said pulley for tilting said wing; and guide members mounted on said wing and engageable in said slot.

In testimony whereof I have signed the foregoing specification.

JOSEPH CICCOIANNI.